US012602417B2

(12) United States Patent
Minami et al.

(10) Patent No.: US 12,602,417 B2
(45) Date of Patent: Apr. 14, 2026

(54) DOCUMENT SEARCH DEVICE, DOCUMENT SEARCH SYSTEM, DOCUMENT SEARCH PROGRAM, AND DOCUMENT SEARCH METHOD

(71) Applicant: SHOWA DENKO K.K., Tokyo (JP)

(72) Inventors: Takuya Minami, Tokyo (JP); Yoshishige Okuno, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 0 days.

(21) Appl. No.: 18/002,105

(22) PCT Filed: Jul. 19, 2021

(86) PCT No.: PCT/JP2021/026992
§ 371 (c)(1),
(2) Date: Dec. 16, 2022

(87) PCT Pub. No.: WO2022/019275
PCT Pub. Date: Jan. 27, 2022

(65) Prior Publication Data
US 2023/0229683 A1 Jul. 20, 2023

(30) Foreign Application Priority Data
Jul. 22, 2020 (JP) ................................ 2020-125341

(51) Int. Cl.
*G06F 16/334* (2025.01)
*G06F 16/3332* (2025.01)

(52) U.S. Cl.
CPC ...... *G06F 16/3346* (2019.01); *G06F 16/3334* (2019.01)

(58) Field of Classification Search
None
See application file for complete search history.

(56) References Cited

U.S. PATENT DOCUMENTS 6,266,636 B1 * 7/2001 Kosaka .................. G10L 15/20 704/256.5
9,230,013 B1 * 1/2016 Ponvert ................. G06F 16/316
2001/0048428 A1 * 12/2001 Ukita .................... G06F 1/1664 345/169
2003/0048889 A1 * 3/2003 Marchead ............ H04M 15/47 379/127.02

(Continued)

FOREIGN PATENT DOCUMENTS

JP 2007-048272 2/2007
JP 2012-141742 7/2012
JP 6374289 8/2018

*Primary Examiner* — Thu N Nguyen
(74) *Attorney, Agent, or Firm* — IPUSA, PLLC

(57) ABSTRACT

A document search device includes an input reception unit configured to receive an input of a keyword of a document search, a document search unit configured to acquire, from a document, a hit character string matching a character string in which a portion of characters of the keyword is replaced with a wildcard, and character strings before and after the hit character string, and compute a likelihood of the hit character string, based on the hit character string, and the character strings before and after the hit character string, and a search result display unit configured to output a result of the document search based on the likelihood.

16 Claims, 11 Drawing Sheets

(56) References Cited

U.S. PATENT DOCUMENTS

| | | | | |
|---|---|---|---|---|
| 2007/0016567 | A1 | 1/2007 | Narusawa | |
| 2008/0098061 | A1* | 4/2008 | Zheng | G09B 7/00 707/E17.014 |
| 2014/0188782 | A1* | 7/2014 | Barnet | G06F 16/283 707/706 |
| 2018/0285928 | A1* | 10/2018 | Kirmani | G06F 16/00 |
| 2020/0159779 | A1* | 5/2020 | Dong | H04L 9/0631 |
| 2021/0117458 | A1* | 4/2021 | Higashinaka | G06F 16/3346 |
| 2021/0218718 | A1* | 7/2021 | Ho | H04L 9/3263 |
| 2021/0374189 | A1* | 12/2021 | Okuno | G06F 16/90344 |

* cited by examiner

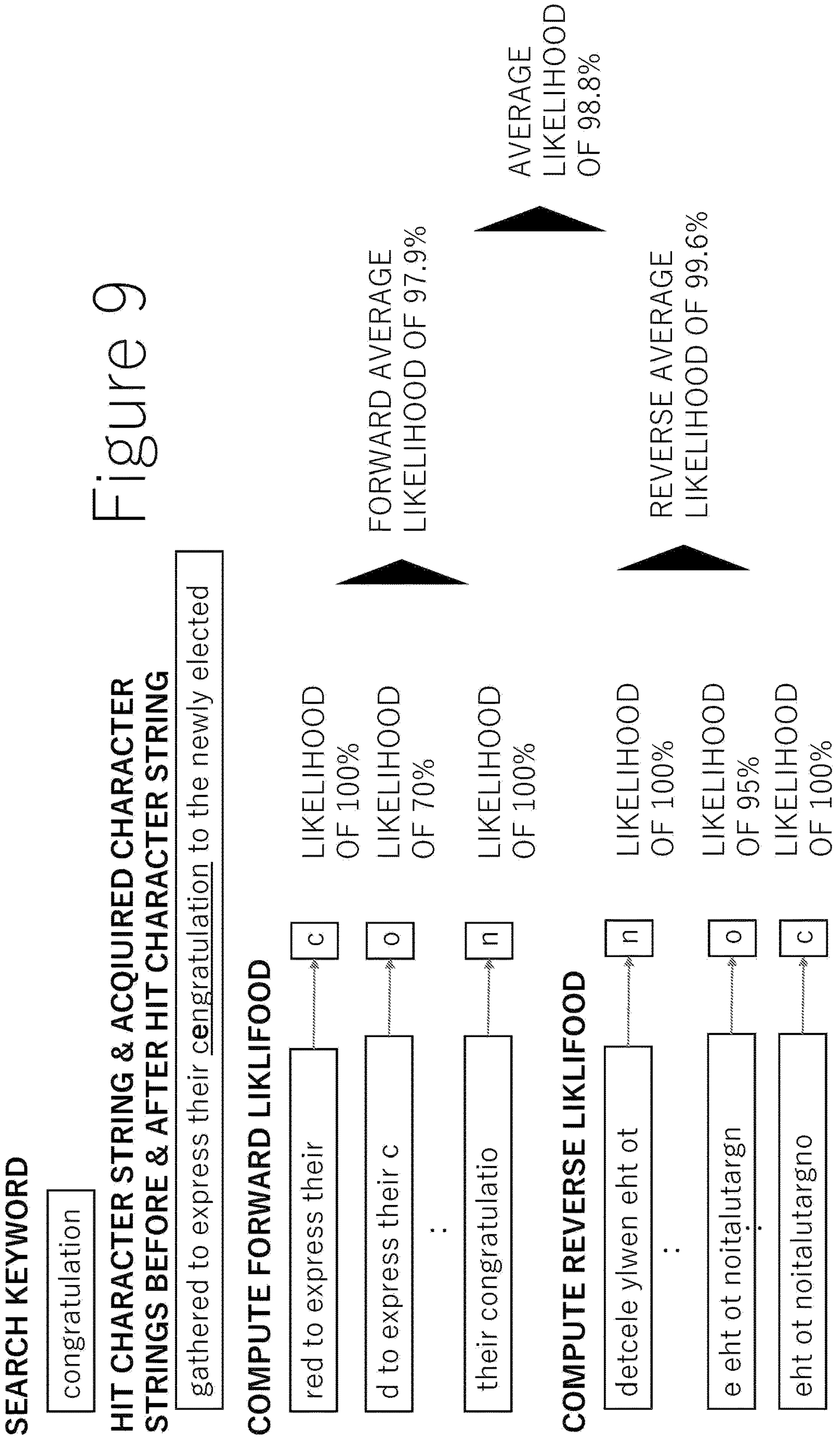

Figure 9

SEARCH KEYWORD congratulation

HIT CHARACTER STRING & ACQIUIRED CHARACTER STRINGS BEFORE & AFTER HIT CHARACTER STRING gathered to express their congratulation to the newly elected

COMPUTE FORWARD LIKLIFOOD

| red to express their | c | LIKELIHOOD OF 100% |

| d to express their c | o | LIKELIHOOD OF 70% |

...

| their congratulatio | n | LIKELIHOOD OF 100% |

FORWARD AVERAGE LIKELIHOOD OF 97.9%

COMPUTE REVERSE LIKLIFOOD

| detcele ylwen eht ot | n | LIKELIHOOD OF 100% |

...

| e eht ot noitalutargn | o | LIKELIHOOD OF 95% |

| eht ot noitalutargno | c | LIKELIHOOD OF 100% |

REVERSE AVERAGE LIKELIHOOD OF 99.6%

AVERAGE LIKELIHOOD OF 98.8%

FIG.10

| | average Precision | average Recall | average F value |
|---|---|---|---|
| Comparative Example 1: KEYWORD SEARCH (EXCLUDING RESULTS WHERE NUMBER OF HITS IS 0) | 1.00 | 0.44 | 0.59 |
| Comparative Example 2: WILDCARD SEARCH | 0.90 | 0.55 | 0.68 |
| Embodiment 1: LSTM SEARCH | 0.89 | 0.70 | 0.77 |

10,20

| 1001 | 1002 | 1003 | 1004 |
|------|------|------|------|
| CPU | ROM | RAM | AUXILIARY STORAGE DEVICE |

B

| 1005 | 1006 | 1007 | 1008 |
|------|------|------|------|
| DISPLAY DEVICE | OPERATION DEVICE | I/F DEVICE | DRIVE DEVICE |

NETWORK

1009

RECORDING MEDIUM

DOCUMENT SEARCH DEVICE, DOCUMENT SEARCH SYSTEM, DOCUMENT SEARCH PROGRAM, AND DOCUMENT SEARCH METHOD

This application is based upon and claims priority to Japanese Patent Application No. 2020-125341, filed on Jul. 22, 2020, the entire contents of which are incorporated herein by reference.

TECHNICAL FIELD

The present invention relates to document search devices, document search systems, document search programs, and document search methods.

BACKGROUND ART

Conventionally, there is a known document search for searching a document based on a keyword specified by a user. In the document search, there is a known method called an exact match search for extracting a character string that completely matches the keyword, and a known method called a partial match search for extracting a character string that partially matches the keyword.

For example, in a case where a document includes a typographical error, the character string desired by the user is not extracted by the exact match search, and an incomplete search occurs. On the other hand, the document can be searched comprehensively by the partial match search.

PRIOR ART DOCUMENTS

Patent Documents

Patent Document 1: Japanese Patent No. 6374289

DISCLOSURE OF THE INVENTION

Problem to be Solved by the Invention

However, in the partial match search, because a character string is extracted as long as the character string matches a part of the keyword, a character string unrelated to the keyword may be extracted. In other words, the exact match search has excellent accuracy but lacks comprehensiveness, while the partial match search has excellent comprehensiveness but lacks accuracy.

It is therefore one object of the present invention to improve a precision of the document search while maintaining a balance between the accuracy and the comprehensiveness.

Means of Solving the Problem

[1] A document search device comprising:

an input reception unit configured to receive an input of a keyword of a document search;

a document search unit configured to acquire, from a document, a hit character string matching a character string in which a portion of characters of the keyword is replaced with a wildcard, and character strings before and after the hit character string, and compute a likelihood of the hit character string, based on the hit character string, and the character strings before and after the hit character string; and a search result display unit configured to output a result of the document search based on the likelihood.

[2] The document search device as recited in [1], wherein the document search unit is configured to compute the likelihood of the hit character string based on a forward likelihood.

[3] The document search device as recited in [1], wherein the document search unit is configured to compute the likelihood of the hit character string based on a forward likelihood and a reverse likelihood.

[4] The document search device as recited in any one of [1] to [3], wherein the document search unit is configured to compute the likelihood of the hit character string based on a likelihood of each character of the hit character string.

[5] The document search device as recited in [4], wherein the document search unit is configured to regard a likelihood of a character that is not the wildcard in the hit character string as 100 percent.

[6] The document search device as recited in any one of [1] to [5], wherein the input reception unit is configured to receive an input of a threshold value of the likelihood of the hit character string, and the search result display unit is configured to display the hit character string having the likelihood greater than or equal to the threshold value, and sentences in a periphery, including the hit character string

[7] The document search device as recited in [6], wherein the search result display unit is configured to further display an image of a handwritten document corresponding to the hit character string having the likelihood greater than or equal to the threshold value, and the sentences in the periphery, including the hit character string.

[8] The document search device as recited in any one of [1] to [7], wherein the search result display unit is configured to output the result of the document search in a descending order of likelihoods of the hit character string.

[9] A document search system including a document searching device, and a user terminal, wherein the document search device includes an input reception unit configured to receive an input of a keyword of a document search;

a document search unit configured to acquire, from a document, a hit character string matching a character string in which a portion of characters of the keyword is replaced with a wildcard, and character strings before and after the hit character string, and compute a likelihood of the hit character string, based on the hit character string, and the character strings before and after the hit character string; and a search result display unit configured to output a result of the document search based on the likelihood.

[10] A program for causing a computer to function as an input reception unit configured to receive an input of a keyword of a document search;

a document search unit configured to acquire, from a document, a hit character string matching a character string in which a portion of characters of the keyword is replaced with a wildcard, and character strings before and after the hit character string, and compute a likelihood of the hit character string, based on the hit character string, and the character strings before and after the hit character string; and a search result display unit configured to output a result of the document search based on the likelihood.

[11] A method executed by a document search device, comprising:

receiving an input of a keyword of a document search;

acquiring, from a document, a hit character string matching a character string in which a portion of characters of the keyword is replaced with a wildcard, and character strings before and after the hit character string;

computing a likelihood of the hit character string, based on the hit character string, and the character strings before and after the hit character string; and outputting a result of the document search based on the likelihood.

Effects of the Invention

According to the present invention, it is possible to improve the precision of the document search while maintaining a balance between the accuracy and the comprehensiveness.

BRIEF DESCRIPTION OF THE DRAWINGS

FIG. 9 is a diagram for explaining a computation of a likelihood according to one embodiment of the present invention.

FIG. 10 is a diagram for comparing a precision of the search according to one embodiment of the present invention.

MODE OF CARRYING OUT THE INVENTION

Figure 1:
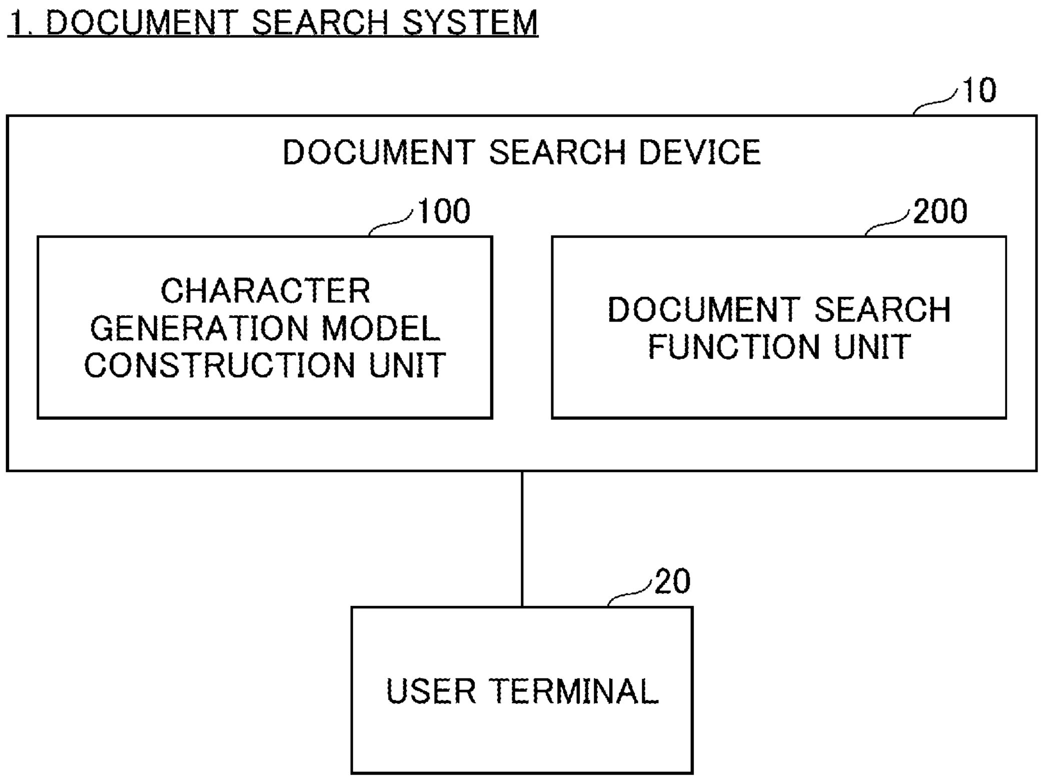
FIG. 1 is a diagram illustrating an overall system configuration including a document search device according to one embodiment of the present invention.

Hereinafter, embodiments will be described with reference to the accompanying drawings. In this specification and drawings, constituent elements having substantially the same functional configuration are designated by the same reference numerals, and a redundant description thereof will be omitted.

<Description of Terms>

The present invention can be applied to a document search for searching one or more arbitrary documents. For example, a "document" is a document converted from an image of a handwritten document using optical character recognition (OCR), a document created using document creating software, or the like. The "document" may include a typographical error.

<System Configuration>

FIG. 1 is a diagram illustrating an overall system configuration including a document search device 10 according to one embodiment of the present invention. As illustrated in FIG. 1, a document search system 1 includes the document search device 10, and a user terminal 20. The document search device 10 can transmit data to and receive data from the user terminal 20 via an arbitrary network. Each of these devices will be described below.

The document search device 10 is a device (for example, a server) that performs a document search process. The document search device 10 includes an input reception unit, a document search unit, and a search result display unit. More particularly, the document search device 10 may include a character generation model construction unit 100, and a document search function unit 200 including the input reception unit, the document search unit, and the search result display unit. The input reception unit, the document search unit, and the search result display unit will be described later. The character generation model construction unit 100 will be described later in detail with reference to FIG. 2, and the document search function unit 200 will be described later in detail with reference to FIG. 4. In this specification, a case where the character generation model construction unit 100 and the document search function unit 200 are provided in a single device will be described, but the character generation model construction unit 100 and the document search function unit 200 may be provided in separate devices.

The user terminal 20 is a terminal that is used when constructing a character generation model, and a terminal that is used when searching a document. For example, the user terminal 20 is a personal computer or the like. In this specification, a case will be described where the terminal that is used when constructing the character generation model and the terminal that is used when searching for the document are formed by a single terminal, but the terminal that is used when constructing the character generation model and the terminal that is used when searching the document may be separate terminals. Further, multiple user terminals 20 may be connected to the document search device 10.

The document search device 10 may include a portion of or all of the functions of the user terminal 20.

<Functional Block of Character Generation Model Construction Unit 100>

Figure 2:
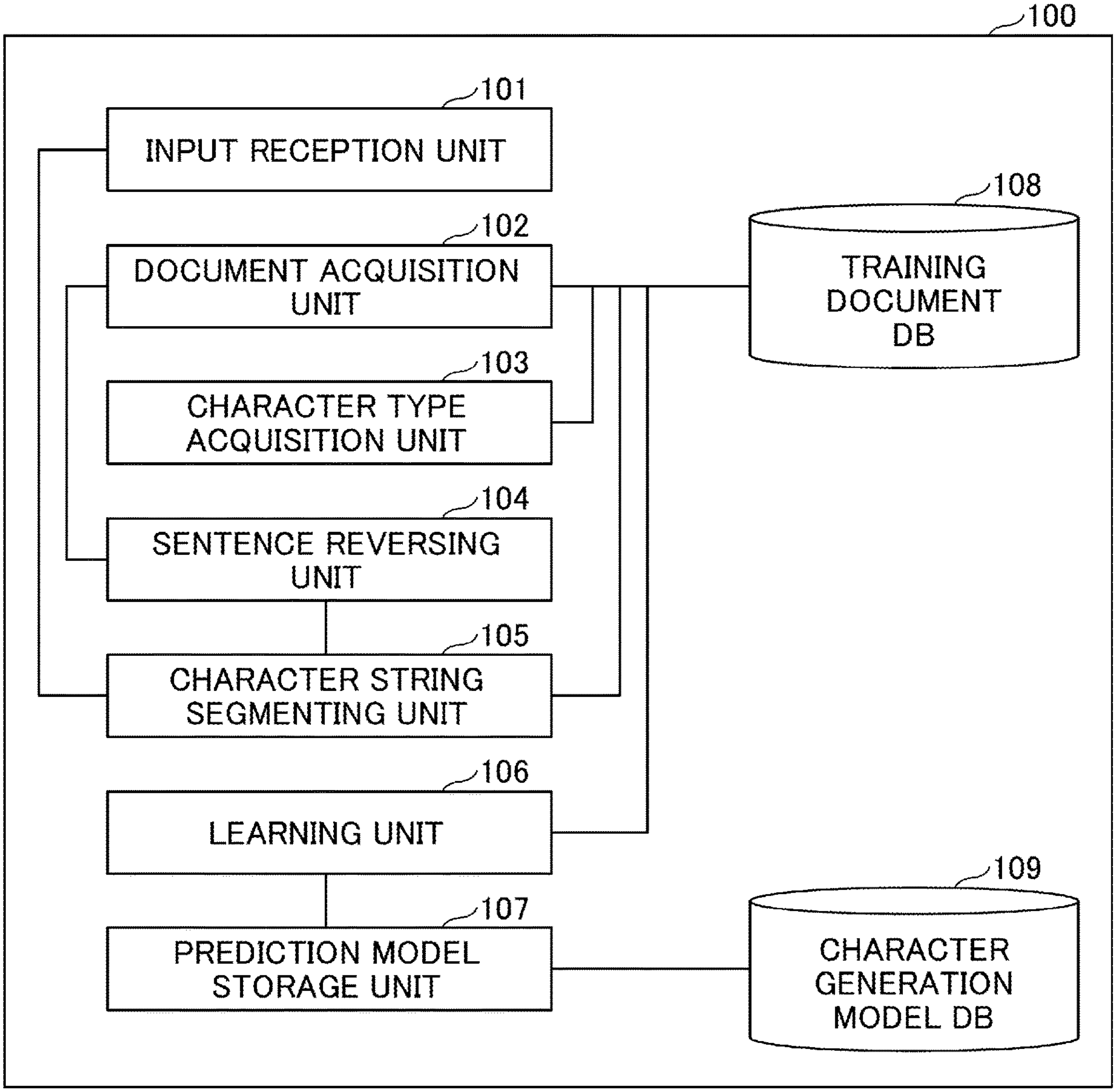
FIG. 2 is a functional block diagram of a character generation model construction unit of the document search device according to one embodiment of the present invention.

FIG. 2 is a functional block diagram of the character generation model construction unit 100 of the document search device 10 according to one embodiment of the present invention. The character generation model construction unit 100 constructs a prediction model (also referred to as a character generation model) that is used by the document search function unit 200. As illustrated in FIG. 2, the character generation model construction unit 100 may include an input reception unit 101, a document acquisition unit 102, a character type acquisition unit 103, a sentence reversing unit 104, a character string segmenting unit 105, a learning unit 106, a prediction model storage unit 107, a training document data base (DB) 108, and a character generation model data base (DB) 109. The document search device 10 can function as the input reception unit 101, the document acquisition unit 102, the character type acquisition unit 103, the sentence reversing unit 104, the character string segmenting unit 105, the learning unit 106, and the prediction model storage unit 107 by executing a program.

The input reception unit 101 receives an input from the user. Hereinafter, the designation of a number of characters of a character string that is input when performing a machine learning, and the designation of a document that is used for the machine learning, will be described separately.

The input reception unit 101 receives the designation of the number of characters (hereinafter also referred to as a designated number of characters) of the character string that is input when the learning unit 106 performs the machine learning. For example, the input reception unit 101 can receive the designation of the number of characters input by the user from the user terminal 20.

The input reception unit 101 receives the designation of the document used for the machine learning (the document used for the machine learning being hereinafter also referred to as a "training document") by the learning unit 106. For example, the input reception unit 101 can receive the designation of the training document input by the user from the user terminal 20. For example, the training document refers to all documents in the training document DB 108, or a document in the training document DB 108 and including contents similar to the document that the user desires to search.

The document acquisition unit 102 acquires the training document from the training document DB 108, according to the designation received by the input reception unit 101. For example, the document acquisition unit 102 acquires all documents in the training document DB 108, or selects and acquires the document in the training document DB 108 and including the contents similar to the document that the user desires to search in the training document DB 108.

Arbitrary documents are stored in the training document DB 108. The documents in the training document DB 108 and the documents in a digital document DB 206 of the document search function unit 200 that will be described later, may be identical to one another, or may be partially or entirely different from one another. For example, the documents in the training document DB 108 are documents that do not include a typographical error.

The character type acquisition unit 103 acquires all of the types of the characters included in the training document acquired by the document acquisition unit 102. The character type is utilized as a prediction output by a character generation model. More particularly, the character type acquisition unit 103 acquires all of the characters from the training document, and creates a set of characters excluding redundant characters.

The sentence reversing unit 104 rearranges the characters included in the training document acquired by the document acquisition unit 102, so that the order of the character strings becomes reversed (inverted) (that is, the character at the end of the document becomes the beginning, and the character at the beginning of the document becomes the end). The document in which the order of the character strings is rearranged to the reverse order will be referred to as a "reverse document", and the document in which the order of the character strings is not rearranged to the reverse order (that is, the document stored in the training document DB 108) will be referred to as a "forward document".

The character string segmenting unit 105 segments, through machine learning, a set of character strings X and y for constructing a forward character generation model, from the training document (that is, the forward document) acquired by the document acquisition unit 102. In addition, the character string segmenting unit 105 segments, through machine learning, a set of character strings X and y for constructing a reverse character generation model, from the document (that is, the reverse document) in which the characters are rearranged by the sentence reversing unit 104. X denotes a character string that is input to the character generation model, and y denotes a character that is output from the character generation model. The number of characters of X is the designated number of characters received by the input reception unit 101. The character type of y is the character type acquired by the character type acquisition unit 103. In other words, y is one of the characters included in the set of characters excluding the redundant characters and created by the character type acquisition unit 103.

Hereinafter, an example of training data will be described, with reference to FIG. 6 and FIG. 7.

Figure 6:
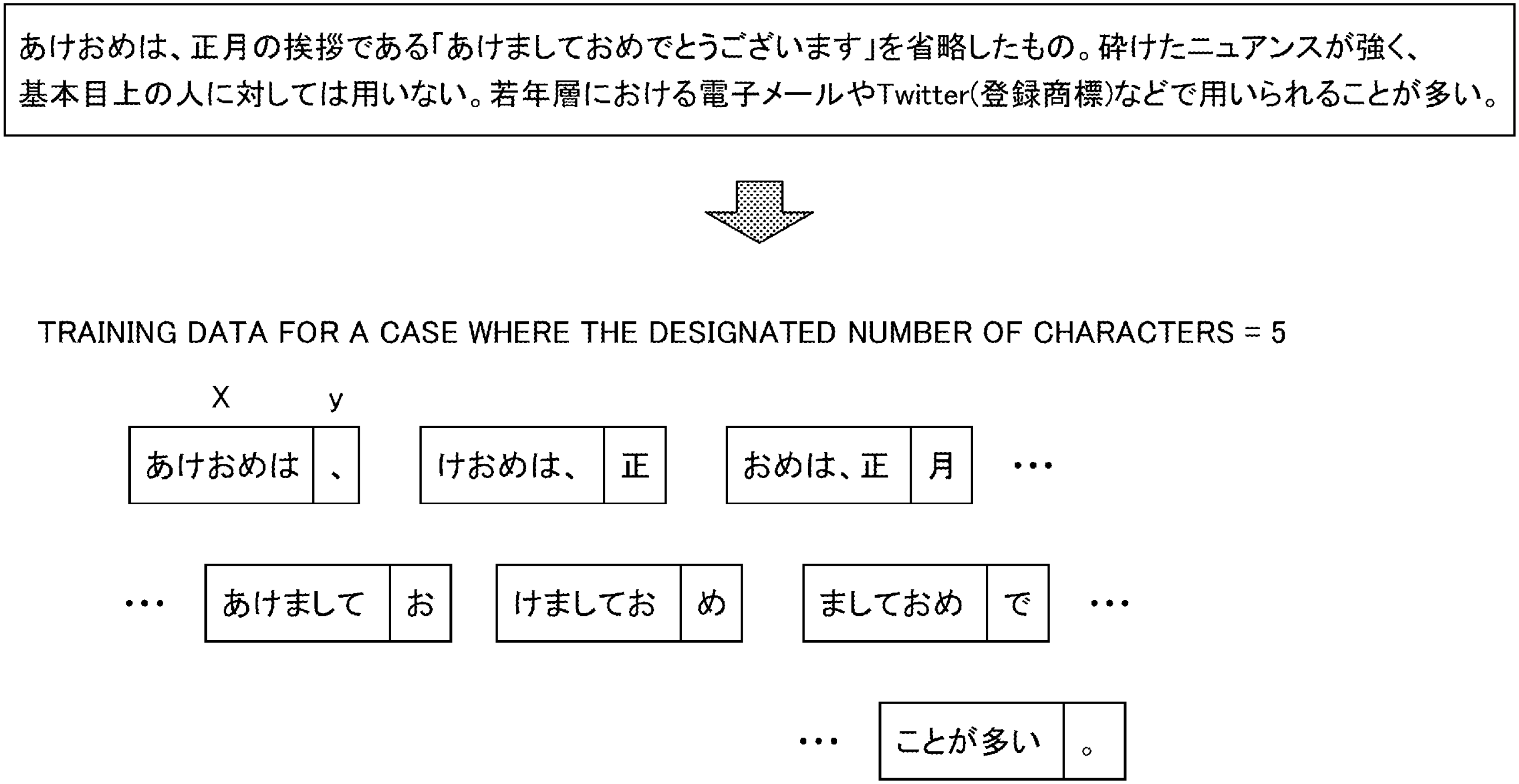
FIG. 6 illustrates an example of training data of a forward character generation model according to one embodiment of the present invention.

FIG. 6 illustrates an example of training data of the forward character generation model according to one embodiment of the present invention. FIG. 6 is a diagram illustrating an example of a character string segmented from the forward document in a case where the designated number of characters is 5. As illustrated in FIG. 6, X denotes the character string of 5 consecutive characters segmented from the forward document, and y denotes 1 character following the character string X.

Figure 7:
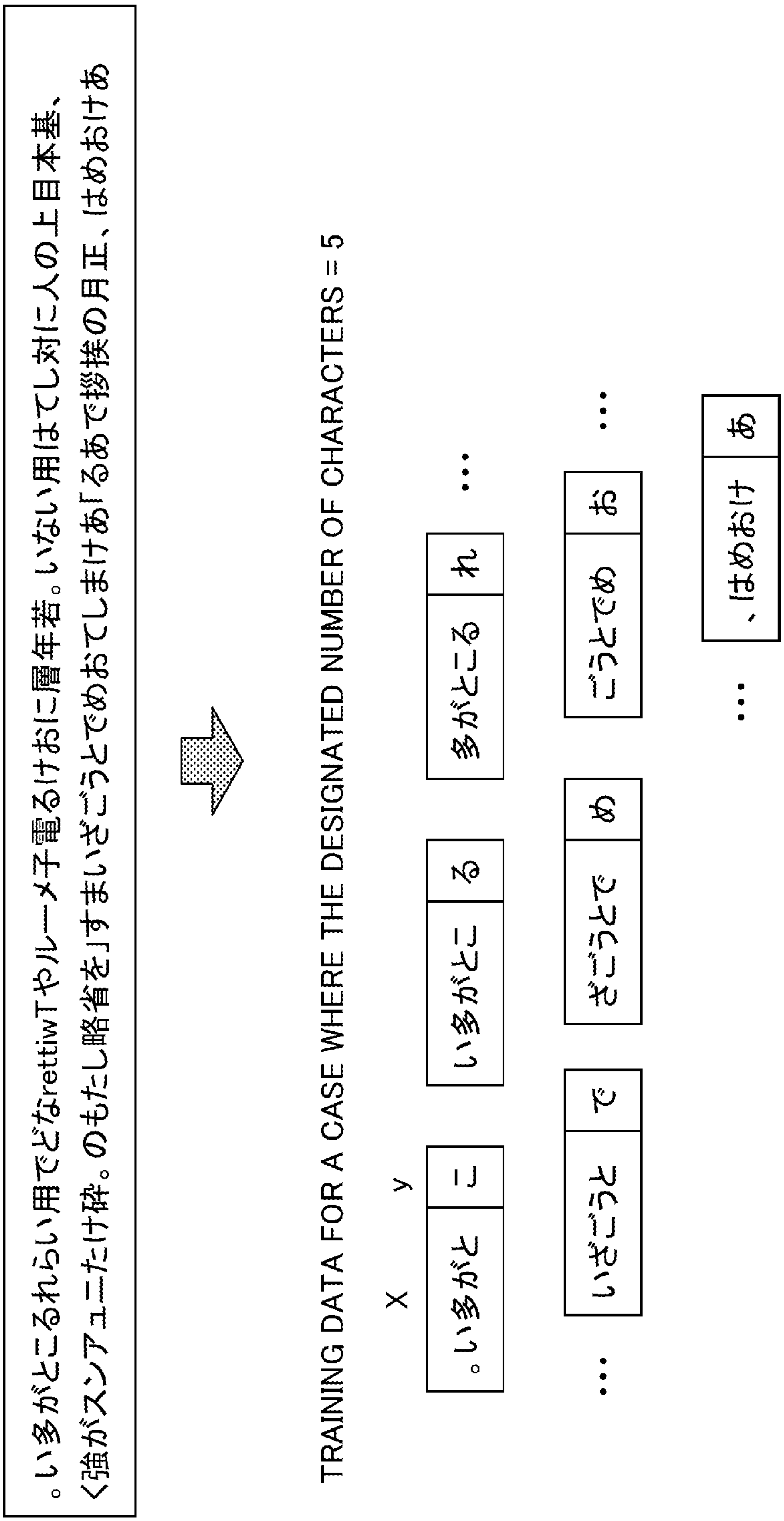
FIG. 7 illustrates an example of training data of a reverse character generation model according to one embodiment of the present invention.

FIG. 7 illustrates an example of training data of a reverse character generation model according to one embodiment of the present invention. FIG. 7 is a diagram illustrating an example of a character string segmented from the reverse document in a case where the designated number of characters is 5. As illustrated in FIG. 7, X denotes the character string of 5 consecutive characters segmented from the reverse document, and y denotes 1 character following the character string X.

Next, the description will return to the description of FIG. 2. The learning unit 106 performs a machine learning using the set of the character strings X segmented by the character string segmenting unit 105 and the set of the characters y, and constructs a character generation model that outputs one character following the character string when the character string is input.

More particularly, the learning unit 106 performs the machine learning using the set of the character strings X and y segmented from the "forward document" by the character string segmenting unit 105, and constructs the forward character generation model. In addition, the learning unit 106 performs machine learning using the set of the character strings X and y segmented from the "reverse document" by the character string segmenting unit 105, and constructs the reverse character generation model. For example, the learning unit 106 can use the learning (for example, a recurrent neural network (RNN), a long short-term memory (LSTM), or the like) capable of handling sequence data of the character strings or the like, as a machine learning (deep learning) technique. For this reason, a prediction can be performed by taking into consideration the order of the character strings.

The prediction model storage unit 107 stores the forward character generation model and the reverse character generation model constructed by the learning unit 106, in the character generation model DB 109.

The character generation model DB 109 stores the forward character generation model and the reverse character generation model.

<Processing Method>

Figure 3:
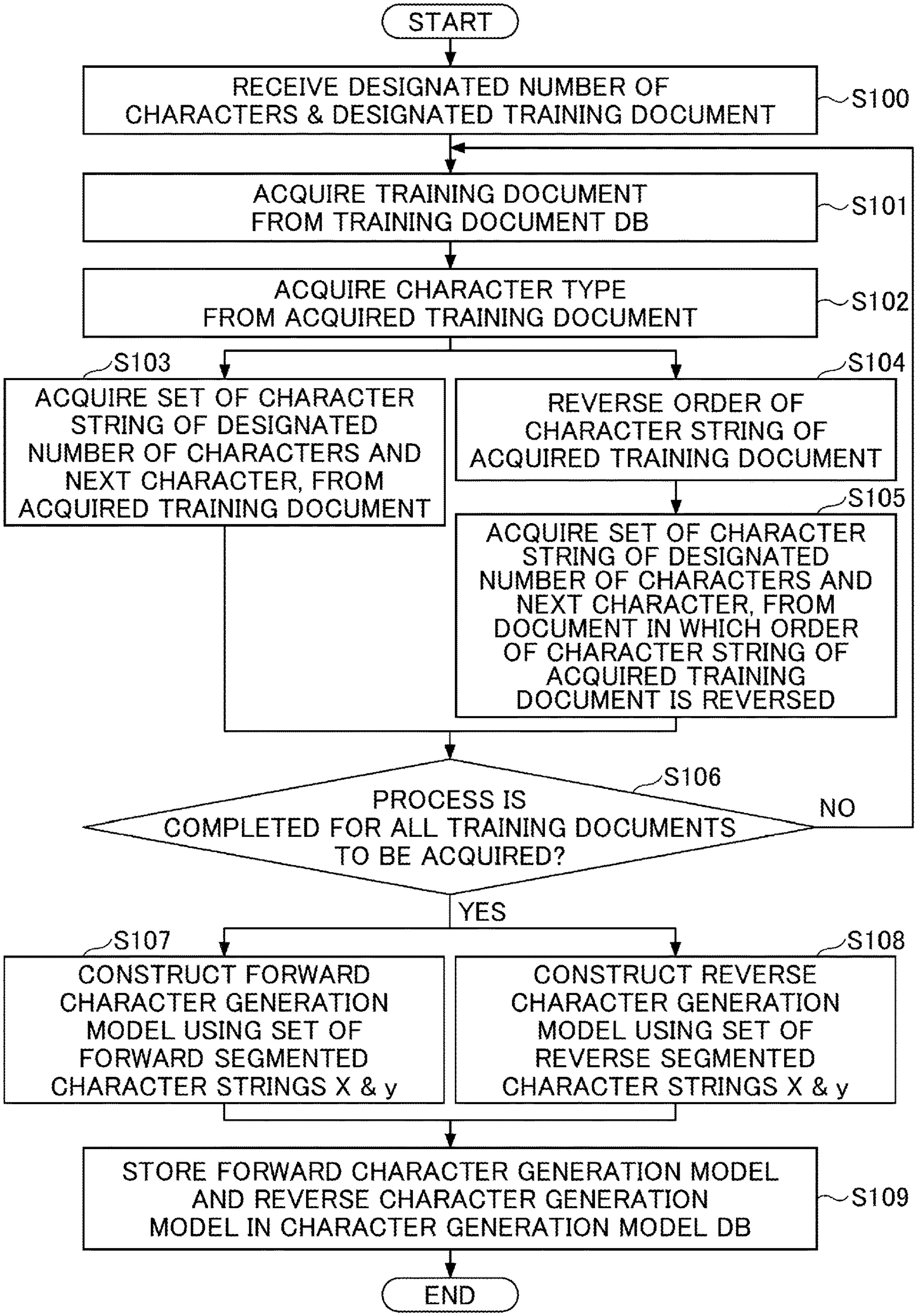
FIG. 3 is a flow chart illustrating a flow of a character generation model construction process according to one embodiment of the present invention.

FIG. 3 is a flow chart illustrating a flow of a character generation model construction process according to one embodiment of the present invention.

In step 100 (S100), the input reception unit 101 receives the designation of the number of characters of the character string to be input when the learning unit 106 performs the machine learning. For example, the input reception unit 101 can receive the designation of the number of characters input by the user from the user terminal 20. In addition, the input reception unit 101 receives the designation of the training document used by the learning unit 106 for the machine learning. For example, the input reception unit 101 can receive the designation of the training document input by the user from the user terminal 20.

In step 101 (S101), the document acquisition unit 102 acquires the training document from the training document DB 108, according to the designation received by the input reception unit 101. For example, the document acquisition unit 102 successively acquires all training documents in the training document DB 108, or selects and acquires a training document in the training document DB 108 and including contents similar to the document that the user desires to search, and successively acquires the selected training documents in a case where multiple selected training documents are present.

In step 102 (S102), the character type acquisition unit 103 acquires all of the characters types included in the training document acquired by the document acquisition unit 102 in S101.

Hereinafter, the segmentation for constructing the forward character generation model (step 103), and the segmentation for constructing the reverse character generation model (step 104 and step 105) will be described separately.

In step 103 (S103), the character string segmenting unit 105 segments the set of character strings X and y for constructing the forward character generation model by machine learning, from the training document acquired by the document acquisition unit 102 in S101. The number of characters of the character string X is the designated number of characters received in S100.

In step 104 (S104), the sentence reversing unit 104 rearranges the characters included in the training document acquired by the document acquisition unit 102 in S101, so that the order of the character string becomes reversed (inverted).

In step 105 (S105), the character string segmenting unit 105 segments the set of character strings X and y for constructing the reverse character generation model by machine learning, from the document in which the order of the character string is reversed by the sentence reversing unit 104 in S104. The number of characters of the character string X is the designated number of characters received in S100.

In step 106 (S106), the character string segmenting unit 105 determines whether or not the segmenting process is completed for all of the training documents to be acquired by the document acquisition unit 102 in S101. The process advances to each of step 107 and step 108 in a case where the segmenting process is completed, the process returns to step 101 in a case where the segmenting process is not completed.

Hereinafter, construction of the forward character generation model (step 107), and construction of the reverse character generation model (step 108), will be described separately.

In step 107 (S107), the learning unit 106 performs the machine learning using the set of character strings X and y segmented from the "forward document" by the character string segmenting unit 105 in S103, and constructs the forward character generation model.

In step 108 (S108), the learning unit 106 performs the machine learning using the set of the character strings X and y segmented from the "reverse document" by the character string segmenting unit 105 in S105, and constructs the reverse character generation model.

In step 109 (S109), the prediction model storage unit 107 stores the forward character generation model constructed by the learning unit 106 in S107, and the reverse character generation model constructed by the learning unit 106 in S108, in the character generation model DB 109.

<Functional Blocks of Document Search Function Unit 200>

Figure 4:
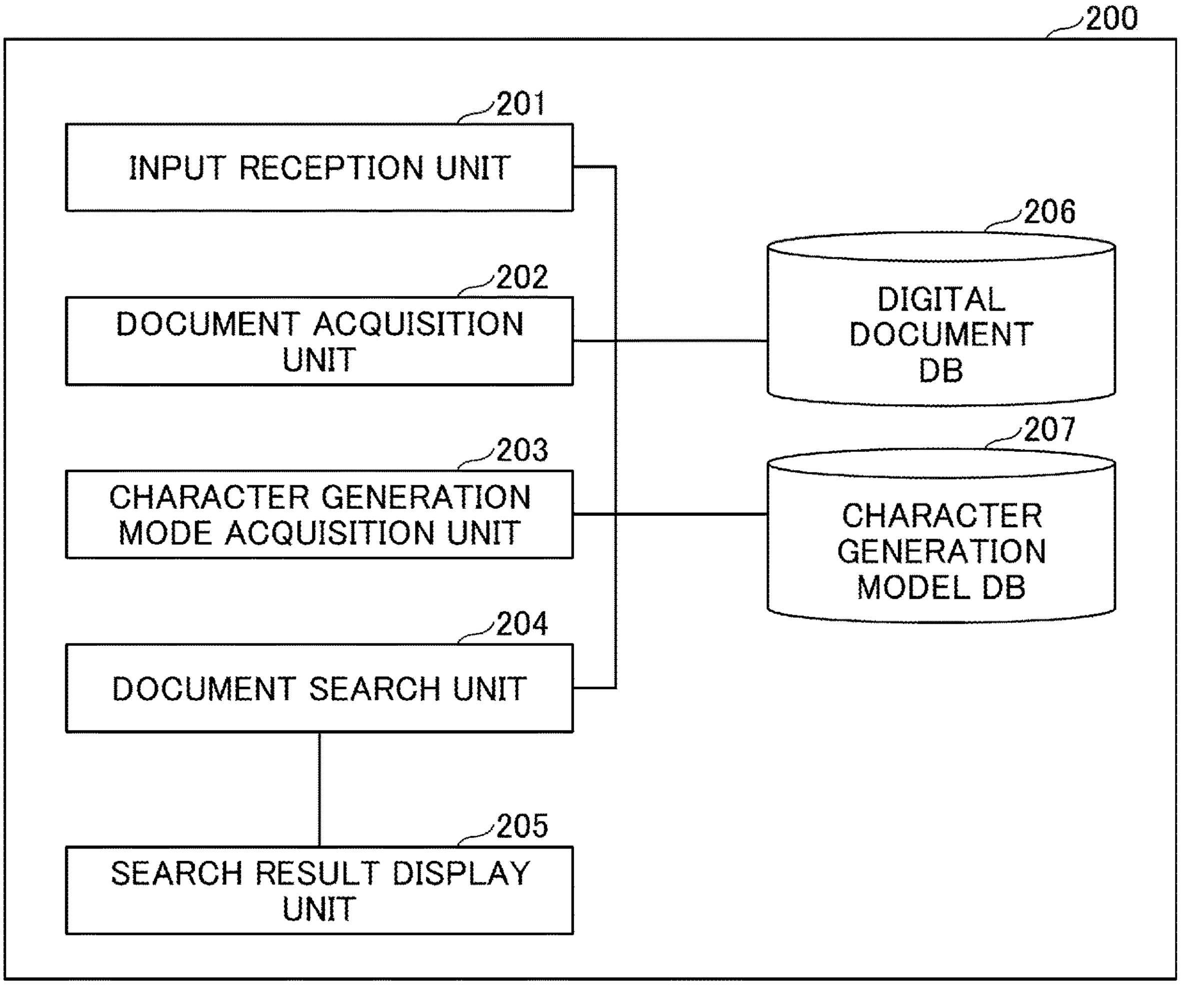
FIG. 4 is a functional block diagram of a document search function unit of the document search device according to one embodiment of the present invention.

FIG. 4 is a diagram illustrating functional blocks of the document search function unit 200 of the document search device 10 according to one embodiment of the present invention. The document search function unit 200 performs the document search process using the prediction model (character generation model) constructed by the character generation model construction unit 100. As illustrated in FIG. 4, the document search function unit 200 may include an input reception unit 201, a document acquisition unit 202, a character generation model acquisition unit 203, a document search unit 204, a search result display unit 205, a digital document data base (DB) 206, and a character generation model data base (DB) 207. The document search function unit 200 can function as the input reception unit 201, the document acquisition unit 202, the character generation model acquisition unit 203, the document search unit 204, and the search result display unit 205 by executing a program.

The input reception unit 201 receives an input from a user. Hereinafter, the document that the user desires to search, a keyword that the user desires to search, a ratio or a number of wildcards replaced with characters in the keyword, a number of characters of the character string input to the character generation model, and a threshold value of likelihood, will be described separately.

The input reception unit 201 receives the designation of one or more documents that the user desires to search. For example, the input reception unit 201 can receive the designation of the one or more documents input by the user from the user terminal 20. According to the present invention, one or more documents designated by the user are searched, based on a keyword designated by the user.

The input reception unit 201 receives the designation of the keyword that the user desires to search. For example, the input reception unit 201 can receive the designation of the keyword input by the user from the user terminal 20. In the present invention, the character in the keyword designated by the user is replaced with a wildcard to search the document.

The input reception unit 201 receives the designation of a ratio of the number of characters of the wildcard with respect to the number of characters of the keyword, or the number of characters of the wildcard. For example, the input reception unit 201 can receive the designation of the ratio of the number of characters of the wildcard, or the number of characters of the wildcard, input by the user from the user terminal 20. The wildcard is a special character, such as an asterisk, a question mark, or the like, to be replaced with the character in the keyword. When performing the search, the wildcard is considered to match any character.

The input reception unit 201 receives the designation of the number of characters of the character string input to the character generation model. More particularly, the input reception unit 201 can receive the designation of the number of characters input by the user from the user terminal 20.

The input reception unit 201 receives the designation of the threshold value of likelihood (details thereof will be described later). More particularly, the input reception unit 201 can receive the designation of the threshold value of the likelihood that is input by the user from the user terminal 20.

The document acquisition unit 202 acquires one or more documents that the user desires to search from the digital document DB 206, according to the designation received by the input reception unit 101.

The digital document DB 206 stores arbitrary documents. The documents in the digital document DB 206 and the documents in the training document DB 108 of the character generation model construction unit 100 may be identical to one another, or may be partially or entirely differ from one another. For example, the documents in the digital document DB 206 are documents including a typographical error.

The character generation model acquisition unit 203 acquires the forward character generation model and the reverse character generation model from the character generation model DB 207.

The character generation model DB 207 stores the forward character generation model and the reverse character generation model constructed by the character generation model construction unit 100.

With respect to all of the documents acquired by the document acquisition unit 202, the document search unit 204 (1) generates a character string including a wildcard from a keyword, (2) searches a document using the character string including the wildcard, to acquire a hit position (hit character string) where the character string including the wildcard hit, and character strings before and after the hit position, (3) computes a likelihood (forward likelihood) of the hit character string, using the character string before the hit character string, and the forward character generation model, (4) computes a likelihood (reverse likelihood) of the hit character string, using the character string after the hit character string, and the reverse character generation model, and (5) computes an average of the forward likelihood and the reverse likelihood, as an effective likelihood of the hit character string. A more detailed description will be given below.

(1) Generation of Character String Including Wildcard

The document search unit 204 replaces a portion of the characters of the keyword received by the input reception unit 201 with the wildcard, to generate the character string including the wildcard. The number of characters to be replaced with the wildcard is determined, based on the ratio or the number of characters of the wildcard received by the input reception unit 201.

(2) Search and Acquisition of Hit Character String and Character Strings Before and After Hit Character String The document search unit 204 searches all of the documents acquired by the document acquisition unit 202 using the character string including the wildcard, and acquires the character strings including the character strings before and after the hit position where the character string including the wildcard hits (the character string matching the character string including the wildcard is also referred tows a "hit character string"). In other words, the document search unit 204 acquires the character string (hit character string) that matches the character string including the wildcard, the character string positioned before the hit character string, and the character string positioned after the hit character string. The number of characters of the character string before the hit character string, and the number of characters of the character string after the hit character string, acquired together with the hit character string, are the numbers of characters of the character string input to the character generation model received by the input reception unit 201.

(3) Computation of Forward Likelihood

The document search unit 204 creates the character string (hereinafter referred to as an input character string) input to the forward character generation model, using the character string before the hit character string, and computes the likelihood of the hit character string. More particularly, the forward likelihood is computed for a case where the hit character string is assumed to be a search keyword.

Hereinafter, a case where the number of characters of the keyword, and the number of characters of the character string before the hit character string, are the same, will be described. The document search unit 204 inputs the character string before the hit character string to the forward character generation model, and computes the likelihood of a beginning character of the hit character string. Next, the document search unit 204 adds the beginning character of the hit character string to the end of the input character string, and inputs the character string excluding the beginning character of the input character string to the forward prediction model, to compute the likelihood of a second character counted from the beginning of the hit character string. The document search unit 204 performs this processing with respect to all of the characters included in the hit character string. The average value of the likelihoods of all of the characters included in the hit character string computed in this manner, is set as the forward likelihood of the hit character string. The method of averaging is not particularly limited, but is desirably an arithmetic mean.

(4) Computation of Reverse Likelihood

The document search unit 204 creates the character string (hereinafter referred to as an input character string) input to the reverse character generation model, using a reversed character string (that is, a character string obtained by rearranging the characters so that the order of the character string is reversed) after the hit character string, and computes the likelihood of the hit character string. More particularly, the reverse likelihood is computed for a case where the hit character string is assumed to be the search keyword.

Hereinafter, a case where the number of characters of the keyword, and the number of characters of the character string after the hit character string, are the same, will be described. The document search unit 204 inputs the reversed character string after the hit character string to the reverse character generation model, and computes the likelihood of an end character of the hit character string. Next, the document search unit 204 adds the end character of the hit character string to the end of the input character string, and inputs the character string excluding the beginning character of the input character string to the reverse prediction model, to compute the likelihood of a second character counted from the end of the hit character string. The document search unit 204 performs this processing with respect to all of the characters included in the hit character string. The average value of the likelihoods of all of the characters included in the hit character string computed in this manner, is set as the reverse likelihood of the hit character string. The method of averaging is not particularly limited, but is desirably an arithmetic mean.

OTHER EMBODIMENTS

In the character string including the wildcard, a character that is not the wildcard is always present in the document.

For this reason, the likelihood of the character that is not the wildcard can be regarded to be 100 percent.

(5) Computation of Effective Likelihood

The document search unit 204 computes the average value of the forward likelihood and the reverse likelihood, as the effective likelihood of the hit character string. The method of averaging is not particularly limited, but is desirably an arithmetic mean.

Hereinafter, particular examples of the search and the computation of the likelihood will be described, with reference to FIG. 8 and FIG. 9.

Figure 8:
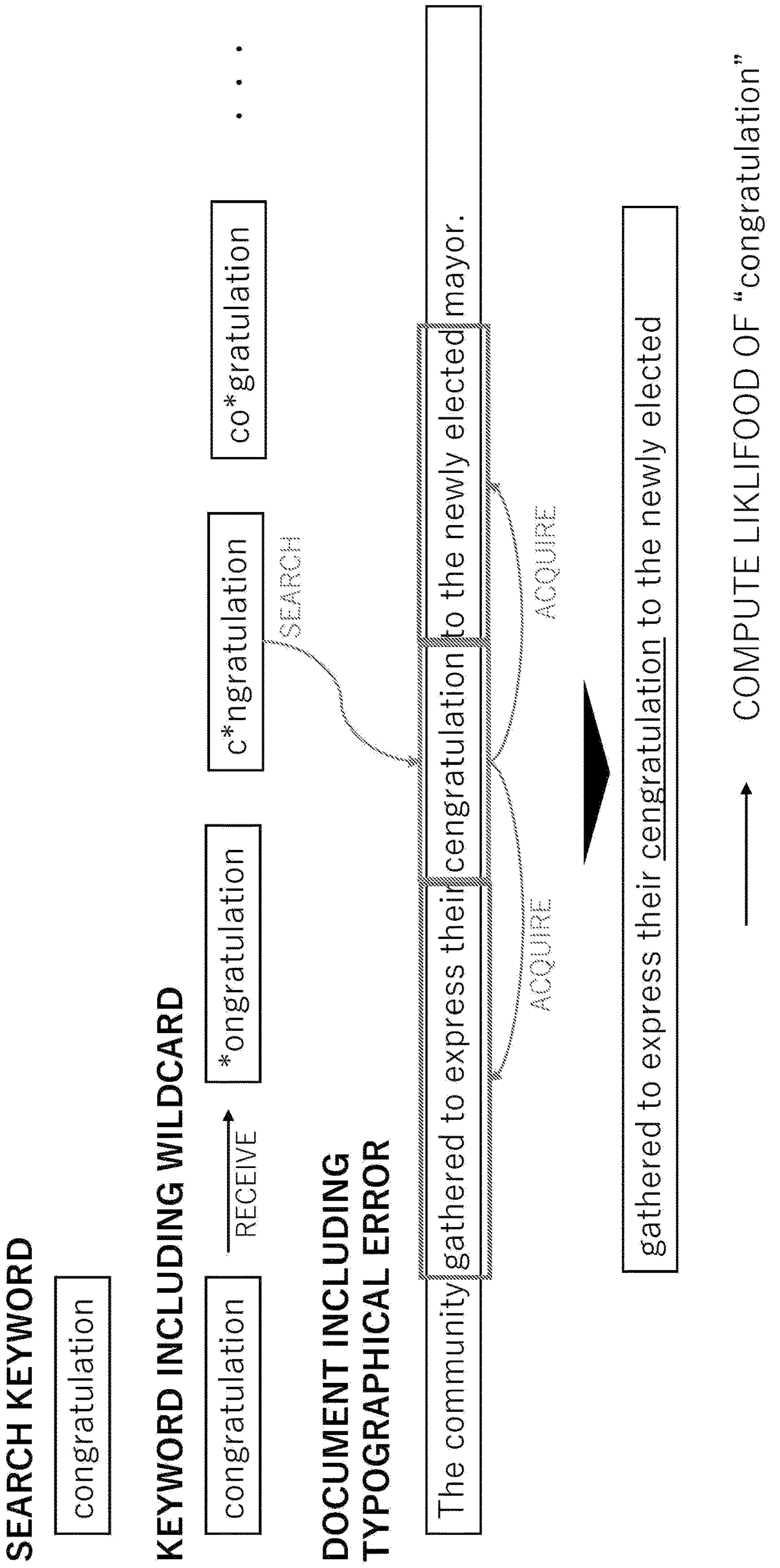
FIG. 8 is a diagram for explaining a search according to one embodiment of the present invention.

FIG. 8 is a diagram for explaining the search according to one embodiment of the present invention. As illustrated in FIG. 8, it is assumed that the keyword that the user desires to search is “おめでとう”. In this case, “おめでと*”, “おめで*う”, “おめ*とう”, “お*でとう”, and “*めでとう” are generated as keywords including the wildcard, by replacing a portion of the characters of the keyword “おめでとう” with the wildcard. Further, it is assumed that the hit character string “おめでとう” is searched. A character string “あけまして” before the hit character string “おめでとう” is acquired, to compute the forward likelihood, and a character string “ございます” after the hit character string “おめでとう” is acquired, to compute the reverse likelihood.

FIG. 9 is a diagram for explaining the computation of the likelihood according to one embodiment of the present invention. As illustrated in FIG. 9, it is assumed that the keyword that the user desires to search is “おめでとう”. Further, it is assumed that the hit character string “おめでとう” is searched. The character string “あけまして” before the hit character string “おめでとう”, and the character string “ございます” after the hit character string “おめでとう” are acquired. The forward likelihood and the reverse likelihood are computed, and the average likelihood obtained by averaging the forward likelihood and the reverse likelihood becomes the effective likelihood.

The forward likelihood will be described. A likelihood for a case where the hit character string is assumed to be the search keyword, is computed as the likelihood. In FIG. 9, the likelihood of each of the characters “お”, “め”, “で”, “で”, “と”, and “う” included in the search keyword is computed. The likelihood for a case where “お” follows “あけまして” is computed (assuming that the likelihood is 100 percent). In addition, the likelihood for a case where “め” follows “けましてお” is computed (assuming that the likelihood is 70 percent). Moreover, the likelihood for a case where “で” follows “ましておめ” is computed (assuming that the likelihood is 100 percent). Further, the likelihood is computed for a case where “と” follows “しておめで” (assuming that the likelihood is 100 percent). In addition, the likelihood is computed for a case where “う” follows “ておめでと” (assuming that the likelihood is 100 percent). An average of all of the likelihoods (that is, the likelihood of “お”, “め”, “で”, “と”, and “う”) is regarded as the forward likelihood (forward average likelihood).

The reverse likelihood will be described. The likelihood is computed in a manner similar to the forward likelihood described above. The likelihood for a case where “う” follows “すまいざご” (assuming that the likelihood is 100 percent). In addition, the likelihood for a case where “と” follows “まいざごう” is computed (assuming that the likelihood is 100 percent). Moreover; the likelihood for a case where “で” follows “いざごうと” is computed (assuming that the likelihood is 100 percent). Further, the likelihood is computed for a case where “め” follows “ざごうとで” (assuming that the likelihood is 95 percent). In addition, the likelihood for a case where “お” follows “ごうとでめ” is computed (assuming that the likelihood is 100 percent). An average of all of the likelihoods (that is, the likelihood of “う”, “と”, “で”, “め”, and “お”) is regarded as the reverse likelihood (reverse average likelihood).

Further, the average of the forward likelihood and the reverse likelihood becomes the effective likelihood (average likelihood).

The description will return to the description of FIG. 4. The search result display unit 205 outputs a search result. More particularly, the search result display unit 205 displays, on a screen of the user terminal 20, a document for which the effective likelihood computed by the document search unit 204 is greater than or equal to the threshold value of the likelihood designated by the user.

For example, the search result display unit 205 can display the hit character string and sentences in a periphery thereof. Moreover, in the case of a document converted from an image of a handwritten document using the OCR, for example, the search result display unit 205 can display the image of the handwritten document as the search result, together with the document having the effective likelihood that is greater than or equal to the threshold value. Further, the search result display unit 205 can display the documents in a descending order of the effective likelihoods, for example.

Although this specification describes the case where the average of the forward likelihood and the reverse likelihood is used as the effective likelihood, it is possible to use only the forward likelihood, or only the reverse likelihood.

<Processing Method>

Figure 5:
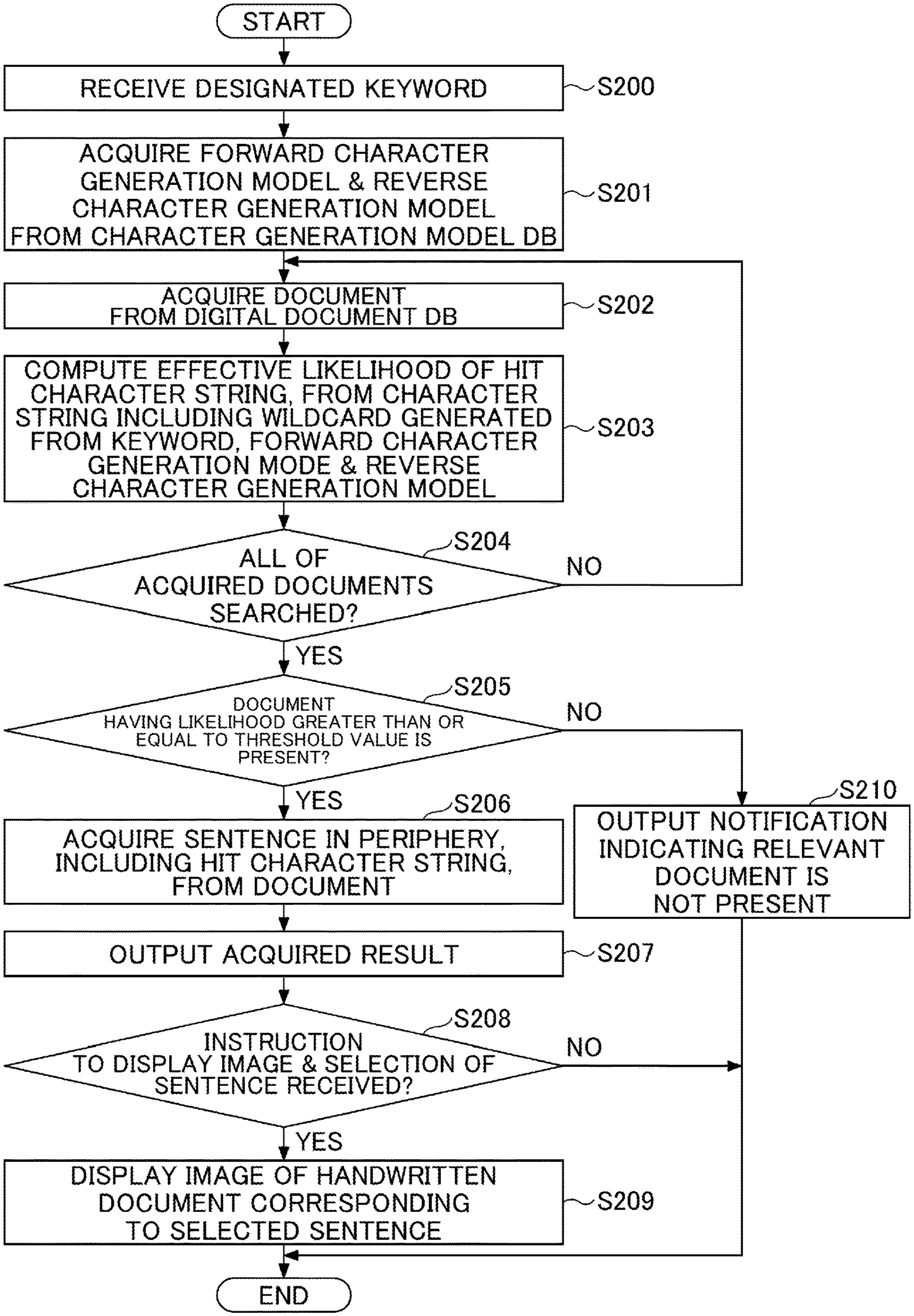
FIG. 5 is a flow chart illustrating a flow of a document search process according to one embodiment of the present invention.

FIG. 5 is a flow chart illustrating a flow of the document search process according to one embodiment of the present invention.

In step 200 (S200), the input reception unit 201 receives the designation of the keyword that the user desires to search. For example, the input reception unit 201 can receive the designation of the keyword input by the user from the user terminal 20.

In step 201 (S201), the character generation model acquisition unit 203 acquires the forward character generation model and the reverse character generation model from the character generation model DB 207.

In step 202 (S202), the document acquisition unit 202 acquires the one or more documents that the user desires to search, from the digital document DB 206, according to the designation received by the input reception unit 201.

In step 203 (S203), the document search unit 204 searches the one or more documents acquired in S202, using the character string including the wildcard generated from the keyword received in S200, to acquire the hit character string. In addition, the document search unit 204 computes the average of the forward likelihood and the reverse likelihood of the hit character string, as the effective likelihood of the hit character string, using the forward character generation model and the reverse character generation model.

In step 204 (S204), the document search unit 204 determines whether or not the search processing for all the documents acquired by the document acquisition unit 202 in S202 has been completed. If completed, the process proceeds to step 205, and if not completed, the process returns to step 202.

In step 205 (S205), the search result display unit 205 determines whether or not there is present a relevant document having the effective likelihood computed by the document search unit 204 in S203 greater than or equal to the threshold value of likelihood designated by the user. The process proceeds to step 206 in a case where such a relevant document is present, and the process proceeds to step 210 in a case where such a relevant document is not present. In step 210 (S210), the search result display unit 205 outputs a notification indicating that such a relevant document is not present, and the process ends.

In step 206 (S206), the search result display unit 205 acquires the sentences in the periphery, including the hit character string.

In step 207 (S207), the search result display unit 205 displays the sentences in the periphery, including the hit character string, as an output of the acquired result.

In step 208 (S208), the search result display unit 205 determines whether or not an instruction to display the image of the handwritten document converted into the document using the OCR, and a selection of the sentence, are received from the user. The process proceeds to step 209 when the instruction and the selection are received, and the process ends when the instruction and the selection are not received.

In step 209 (S209), the search result display unit 205 displays the image of the handwritten document corresponding to the sentence selected in S208.

<Evaluation of Precision of Search>

Hereinafter, an evaluation of the precision of the search will be described.

The precision of the search was evaluated for a novel entitled " 吾輩は猫である'. This document includes 2245 paragraphs. By randomly replacing 20% of the characters in this document with another character, a document including typographical errors was artificially generated.

細君(107), 蕎麦(6), 鰹節(10), 迷亭君(64), 大和魂(7), 風呂敷(6), 神経衰弱(6), ダムダム弾(4), シャンパン(6), and ヴァイオリン(61) were used as keywords. The number in brackets represents the number of paragraphs including each keyword.

<Document Search (LSTM Search) by Document Search Device 10>

The paragraph that includes the character string including the wildcard is acquired, by searching the document using the character string in which a portion of the characters of the keyword is replaced with the wildcard, and the precision of the search was quantitatively evaluated by determining whether or not the document is a correct answer for the paragraph that includes the character string including the wildcard. A long short-term memory (LSTM) was used for the learning capable of treating sequence data, such as the character string or the like. The learning using the LSTM was performed by TensorFlow (registered trademark) that is a software library for use in the machine learning. The number of epochs of the learning was 200. The number of characters of the character string that is input was 8.

"Precision", "Recall", and "F value" were computed as evaluation indexes for the precision of the search.

The "Precision" is a value computed by dividing the number of documents that are correct answers hit during the search, by a total number of documents hit during the search, and can be regarded as an index representing the accuracy of the search.

The "Recall" is a value computed by dividing the number of documents that are correct answers hit during the search, by a number of all documents that are correct answers, and can be regarded as an index representing the comprehensiveness of the search.

The "F value" is a value computed by a harmonic mean of the "Precision" and the "Recall", and can be regarded as an index representing a balance between the accuracy and the comprehensiveness of the search.

The "Precision", the "Recall", and the "F value" were obtained for each keyword, and macro average values thereof were computed as "average Precision", "average Recall", and "average F value", respectively.

In the document search by the document search device 10 according to the present invention, it is necessary to set the ratio of the wildcards in the keyword (wildcard ratio), and the threshold value of the effective likelihood of the hit character string, as hyper parameters affecting the precision of the search. In this example, 50% of the paragraphs in the document were used as training data, and the hyper parameters were tuned so that the "F value" in the training document becomes the highest. As a result, the wildcard ratio became 0.6, and the threshold value of the effective likelihood of the hit character string became 0.8. Using these hyper parameters, the document search was performed using the character string including the wildcard. In this case, the remaining 50% of the paragraphs, other than the training data, were used as test data when performing the document search, and the precision of the search was evaluated. In a case where the keyword is not present in the test data, the keyword was excluded from the evaluation of the precision of the search.

Comparative Example 1 (Keyword Search)

In a comparative example 1, a document search was performed using only the keyword (that is, an exact match search), without using the wildcard nor the effective likelihood. Otherwise, the precision of the search was evaluated by procedures similar to those of, <Document Search (LSTM Search) by Document Search Device 10>.

Comparative Example 2 (Wildcard Search)

In a comparative example 2, a document search was performed using a character string including a wildcard (that is, a partial match search), without using the effective likelihood. In the comparative example 2, it is necessary to set the wildcard ratio as the hyper parameter that affects the precision of the search. Hence, the hyper parameter was tuned by procedures similar to those of <Document Search (LSTM Search) by Document Search Device 10>. As a result, the wildcard ratio was 0.3. Otherwise, the precision of the search was evaluated by procedures similar to those of <Document Search (LSTM Search) by Document Search Device 10>.

FIG. 10 is a diagram for comparing the precision of the search according to one embodiment of the present invention. More particularly, FIG. 10 is a diagram illustrating the precisions of the document search by the document search device 10 according to the present invention, the first comparative example, and the second comparative example. As illustrated in FIG. 10, by using the document search device 10 according to the present invention, both the "average Precision" and the "average Recall" become high numerical values that are well balanced. As a result, it can be seen that the "average F value" becomes a high numerical value compared to those of the comparative examples. From the above results, it may be seen that the precision of the document search can be improved while maintaining the balance between the accuracy and the comprehensiveness, by using the document search device 10 described in this specification.

<Effects>

As described above, according to the present invention, the document search device can compute the likelihood of the character string segmented by the search using the character string including the wildcard, similar to determining whether or not the typographical error is present from human prediction based on context before and after the character string. For this reason, even when the document includes the typographical error, it is possible to accurately and comprehensively acquire the desired document.

In addition, the likelihood differs depending on whether the likelihood is computed from the head or from the tail. By computing the likelihoods predicted from before and after the sentence and taking the average of both of these likelihoods, it is possible to obtain a likelihood that is more consistent with human intuition.

<Hardware Configuration>

Figure 11:
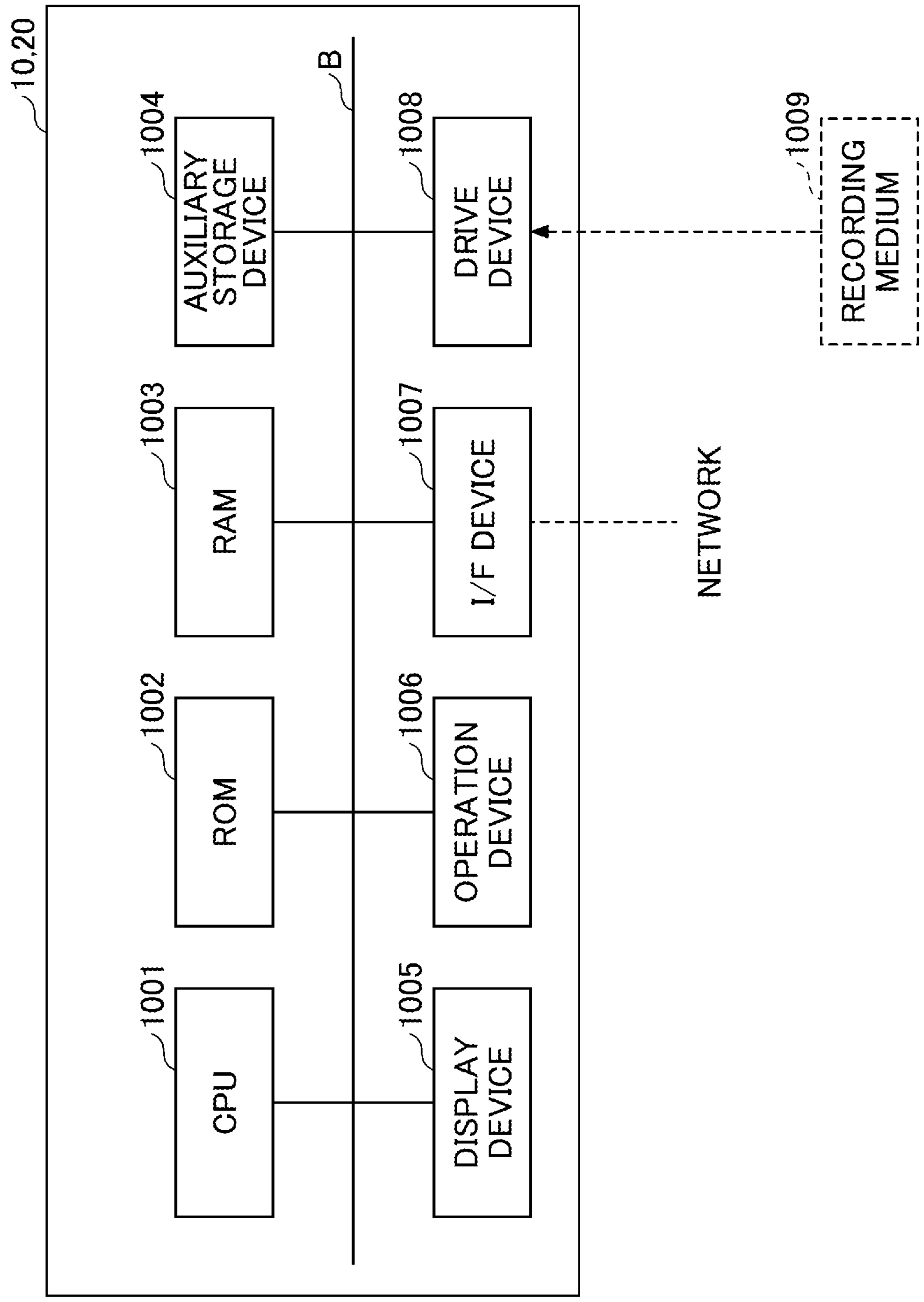
FIG. 11 is a diagram illustrating a hardware configuration of the document search device and a user terminal according to one embodiment of the present invention.

FIG. 11 is a diagram illustrating a hardware configuration of the document search device 10 and the user terminal 20 according to one embodiment of the present invention. The document search device 10 and the user terminal 20 each include a central processing unit (CPU) 1001, a read only memory (ROM) 1002, and a random access memory (RAM) 1003. The CPU 1001, the ROM 1002, and the RAM 1003 form a so-called computer.

In addition, each of the document search device 10 and the user terminal 20 may include an auxiliary storage device 1004, a display device 1005, an operation device 1006, an interface (I/F) device 1007, and a drive device 1008.

The hardware components in each of the document search device 10 and the user terminal 20 are connected to one another via a bus B.

The CPU 1001 is a computing device that executes various programs installed in the auxiliary storage device 1004.

The ROM 1002 is a non-volatile memory. The ROM 1002 functions as a main storage device that stores various programs, data, or the like required by the CPU 1001 to execute the various programs installed in the auxiliary storage device 1004. More particularly, the ROM 1002 functions as a main storage device that stores a boot program or the like, such as a basic input output system (BIOS), an extensible firmware interface (EFI), or the like.

The RAM 1003 is a volatile memory, such as a dynamic random access memory (DRAM), a static random access memory (SRAM), or the like. The RAM 1003 functions as a main storage device that provides a work area to which the various programs installed in the auxiliary storage device 1004 are loaded when the programs are executed by the CPU 1001.

The auxiliary storage device 1004 is an auxiliary storage device that stores the various programs, and information used when the various programs are executed.

The display device 1005 is a display device that displays internal states or the like of the document search device 10 and the user terminal 20.

The operation device 1006 is an input device from which a person who operates the document search device 10 and the user terminal 20 inputs various instructions with respect to the document search device 10 and the user terminal 20.

The I/F device 1007 is a communication device that communicates with other devices by connecting to a network.

The drive device 1008 is a device to which a recording medium 1009 is set. The recording medium 1009 includes a medium for optically, electrically, or magnetically recording information, such as a CD-ROM, a flexible disk, a magneto-optical disk, or the like. In addition, the recording medium 1009 may include a semiconductor memory or the like that electrically records information, such as an erasable programmable read only memory (EPROM), a flash memory, or the like.

The various programs are installed in the auxiliary storage device 1004 by setting the distributed recording medium 1009 in the drive device 1008, and reading out the various programs recorded in the recording medium 1009 by the drive device 1008, for example. Alternatively, the various programs may be installed in the auxiliary storage device 1004 by downloading the various programs from the network via the I/F device 1007.

Although the embodiments of the present invention are described above in detail, the present invention is not limited to the specific embodiments described above, and various variations and modifications can be made within the scope of the subject matter of the present invention recited in the claims.

DESCRIPTION OF REFERENCE NUMERALS

1 Document search system
10 Document search device
20 User terminal
100 Character generation model construction unit
200 Document search function unit
101 Input reception unit
102 Document acquisition unit
103 Character type acquisition unit
104 Sentence reversing unit
105 Character string segmenting unit
106 Learning unit
107 Prediction model storage unit
108 Training document DB
109 Character generation model DB
201 Input reception unit
202 Document acquisition unit
203 Character generation model acquisition unit
204 Document search unit
205 Search result display unit
206 Digital document DB
207 Character generation model DB
1001 CPU
1002 ROM
1003 RAM
1004 Auxiliary storage device
1005 Display device
1006 Operation device
1007 I/F device
1008 Drive device
1009 Recording medium

The invention claimed is:

1. A document search device comprising:

a memory configured to store a program; and a processor configured to execute the program stored in the memory and perform a process including:

receiving a keyword of a document search, the keyword consisting of text characters that are an arbitrary combination of letters, numbers, and symbols;

acquiring, from a text document, a hit character string matching a character string having a portion of the text characters of the keyword replaced with a wildcard which is a special text character considered to match all text characters during the document search, and character strings of the text document before and after the hit character string;

computing a forward likelihood of the hit character string based on the character string before the hit character string;

computing a reverse likelihood of the hit character string based on a reversed character string after the hit character string, obtained by rearranging text characters of the character string after the hit character string, so that an order of the text characters of the character string after the hit character string is reversed and the text character at an end of the character string becomes the text character at a beginning of the reversed character string and the text character at a beginning of the character string becomes the text character at an end of the reversed character string;

computing a likelihood of the hit character string based on both the forward likelihood computed by the computing the forward likelihood and the reverse likelihood computed by the computing the reverse likelihood; and outputting a result of the document search based on the likelihood of the hit character string computed by the computing the likelihood based on both the forward likelihood and the reverse likelihood, wherein:

the computing the forward likelihood computes the forward likelihood for a case where the hit character string is assumed to be a search keyword, based on the character string before the hit character string by computing a likelihood of a beginning text character of the hit character string, adding the beginning text character of the hit character string to an end of the input character string before the hit character string and excluding a beginning text character of the input character string before the hit character string to compute a likelihood of a second text character counted from the beginning of the hit character string, and performing a similar process with respect to all of a third and subsequent text characters counted from the beginning of the hit character string, and the computing the reverse likelihood computes the reverse likelihood for the case where the hit character string is assumed to be the search keyword, based on the reversed character string after the hit character string by computing a likelihood of an end text character of the hit character string, adding the end text character of the hit character string to an end of the reversed character string after the hit character string and excluding a beginning text character of the reversed character string after the hit character string to compute a likelihood of a second text character counted from the end of the hit character string, and performing a similar process with respect to all of a third and subsequent text characters counted from the end of the hit character string.

2. The document search device as claimed in claim 1, wherein the computing the likelihood of the hit character string computes the likelihood of the hit character string based on a likelihood of each text character of the hit character string.

3. The document search device as claimed in claim 2, wherein the computing the likelihood of the hit character string regards a likelihood of a text character that is not the wildcard in the hit character string as 100 percent.

4. The document search device as claimed in claim 1, wherein:

the receiving receives an input of a threshold value of the likelihood of the hit character string, and the outputting displays the hit character string having the likelihood greater than or equal to the threshold value, and sentences in a periphery, including the hit character string.

5. The document search device as claimed in claim 4, wherein the outputting further displays an image of a handwritten document corresponding to the hit character string having the likelihood greater than or equal to the threshold value, and the sentences in the periphery, including the hit character string.

6. The document search device as claimed in claim 1, wherein the outputting outputs the result of the document search in a descending order of likelihoods of the hit character string.

7. A document search system comprising:

a document search device; and a user terminal, wherein the document search device includes:

a memory configured to store a program, and a processor configured to execute the program stored in the memory and perform a process including receiving a keyword of a document search, the keyword consisting of text characters that are an arbitrary combination of letters, numbers, and symbols;

acquiring, from a text document, a hit character string matching a character string having a portion of the text characters of the keyword replaced with a wildcard which is a special text character considered to match all text characters during the document search, and character strings of the text document before and after the hit character string;

computing a forward likelihood of the hit character string based on the character string before the hit character string;

computing a reverse likelihood of the hit character string based on a reversed character string after the hit character string, obtained by rearranging text characters of the character string after the hit character string, so that an order of the text characters of the character string after the hit character string is reversed and the text character at an end of the character string becomes the text character at a beginning of the reversed character string and the text character at a beginning of the character string becomes the text character at an end of the reversed character string;

computing a likelihood of the hit character string based on both the forward likelihood computed by the computing the forward likelihood and the reverse likelihood computed by the computing the reverse likelihood; and outputting a result of the document search based on the likelihood of the hit character string computed by the computing the likelihood based on both the forward likelihood and the reverse likelihood, wherein:

the computing the forward likelihood computes the forward likelihood for a case where the hit character string is assumed to be a search keyword, based on the character string before the hit character string by computing a likelihood of a beginning text character of the hit character string, adding the beginning text character of the hit character string to an end of the input character string before the hit character string and excluding a beginning text character of the input character string before the hit character string to compute a likelihood of a second text character counted from the beginning of the hit character string, and performing a similar process with respect to all of a third and subsequent text characters counted from the beginning of the hit character string, and the computing the reverse likelihood computes the reverse likelihood for the case where the hit character string is assumed to be the search keyword, based on the reversed character string after the hit character string by computing a likelihood of an end text character of the hit character string, adding the end text character of the hit character string to an end of the reversed character string after the hit character string and excluding a beginning text character of the reversed character string after the hit character string to compute a likelihood of a second text character counted from the end of the hit character string, and performing a similar process with respect to all of a third and subsequent text characters counted from the end of the hit character string.

8. A non-transitory computer-readable recording medium storing a program which, when executed by a computer, causes the computer to perform a process comprising:

receiving a keyword of a document search, the keyword consisting of text characters that are an arbitrary combination of letters, numbers, and symbols;

acquiring, from a text document, a hit character string matching a character string having a portion of the text characters of the keyword replaced with a wildcard which is a special text character considered to match all text characters during the document search, and character strings of the text document before and after the hit character string;

computing a forward likelihood of the hit character string based on the character string before the hit character string;

computing a reverse likelihood of the hit character string based on a reversed character string after the hit character string, obtained by rearranging text characters of the character string after the hit character string, so that an order of the text characters of the character string after the hit character string is reversed and the text character at an end of the character string becomes the text character at a beginning of the reversed character string and the text character at a beginning of the character string becomes the text character at an end of the reversed character string;

computing a likelihood of the hit character string based on both the forward likelihood computed by the computing the forward likelihood and the reverse likelihood computed by the computing the reverse likelihood; and outputting a result of the document search based on the likelihood of the hit character string computed by the computing the likelihood based on both the forward likelihood and the reverse likelihood, wherein:

the computing the forward likelihood computes the forward likelihood for a case where the hit character string is assumed to be a search keyword, based on the character string before the hit character string by computing a likelihood of a beginning text character of the hit character string, adding the beginning text character of the hit character string to an end of the input character string before the hit character string and excluding a beginning text character of the input character string before the hit character string to compute a likelihood of a second text character counted from the beginning of the hit character string, and performing a similar process with respect to all of a third and subsequent text characters counted from the beginning of the hit character string, and the computing the reverse likelihood computes the reverse likelihood for the case where the hit character string is assumed to be the search keyword, based on the reversed character string after the hit character string by computing a likelihood of an end text character of the hit character string, adding the end text character of the hit character string to an end of the reversed character string after the hit character string and excluding a beginning text character of the reversed character string after the hit character string to compute a likelihood of a second text character counted from the end of the hit character string, and performing a similar process with respect to all of a third and subsequent text characters counted from the end of the hit character string.

9. A computer-implemented method for performing a document search, the computer-implemented method comprising:

receiving, by the computer, a keyword of a document search, the keyword consisting of text characters that are an arbitrary combination of letters, numbers, and symbols;

acquiring, by the computer from a text document, a hit character string matching a character string having a portion of the text characters of the keyword replaced with a wildcard which is a special text character considered to match all text characters during the document search, and character strings of the text document before and after the hit character string;

computing, by the computer, a forward likelihood of the hit character string based on the character string before the hit character string;

computing, by the computer, a reverse likelihood of the hit character string based on a reversed character string after the hit character string, obtained by rearranging text characters of the character string after the hit character string, so that an order of the text characters of the character string after the hit character string is reversed and the text character at an end of the character string becomes the text character at a beginning of the reversed character string and the text character at a beginning of the character string becomes the text character at an end of the reversed character string;

computing, by the computer, a likelihood of the hit character string based on both the forward likelihood computed by the computing the forward likelihood and the reverse likelihood computed by the computing the reverse likelihood; and outputting, by the computer, a result of the document search based on the likelihood of the hit character string computed by the computing the likelihood based on both the forward likelihood and the reverse likelihood, wherein:

the computing the forward likelihood computes the forward likelihood for a case where the hit character string is assumed to be a search keyword, based on the character string before the hit character string by computing a likelihood of a beginning text character of the hit character string, adding the beginning text character of the hit character string to an end of the input character string before the hit character string and excluding a beginning text character of the input character string before the hit character string to compute a likelihood of a second text character counted from the beginning of the hit character string, and performing a similar process with respect to all of a third and subsequent text characters counted from the beginning of the hit character string, and the computing the reverse likelihood computes the reverse likelihood for the case where the hit character string is assumed to be the search keyword, based on the reversed character string after the hit character string by computing a likelihood of an end text character of the hit character string, adding the end text character of the hit character string to an end of the reversed character string after the hit character string and excluding a beginning text character of the reversed character string after the hit character string to compute a likelihood of a second text character counted from the end of the hit character string, and performing a similar process with respect to all of a third and subsequent text characters counted from the end of the hit character string.

10. The document search device as claimed in claim 1, wherein the computing the likelihood based on both the forward likelihood and the reverse likelihood computes an average value of the forward likelihood and the reverse likelihood, as an effective likelihood of the hit character string.

11. The document search device as claimed in claim 1, wherein the acquiring replaces the portion of the text characters of the keyword with the wildcard to generate the character string including the wildcard, and a number of text characters to be replaced with the wildcard is determined based on a ratio of a number of text characters of the wildcard with respect to a number of text characters of the keyword, or based on the number of text characters of the wildcard.

12. The document search system as claimed in claim 7, wherein the computing the likelihood based on both the forward likelihood and the reverse likelihood computes an average value of the forward likelihood and the reverse likelihood, as an effective likelihood of the hit character string.

13. The document search system as claimed in claim 7, wherein the acquiring replaces the portion of the text characters of the keyword with the wildcard to generate the character string including the wildcard, and a number of text characters to be replaced with the wildcard is determined based on a ratio of a number of text characters of the wildcard with respect to a number of text characters of the keyword, or based on the number of text characters of the wildcard.

14. The non-transitory computer-readable recording medium as claimed in claim 8, wherein the computing the likelihood based on both the forward likelihood and the reverse likelihood computes an average value of the forward likelihood and the reverse likelihood, as an effective likelihood of the hit character string.

15. The non-transitory computer-readable recording medium as claimed in claim 8, wherein the acquiring replaces the portion of the text characters of the keyword with the wildcard to generate the character string including the wildcard, and a number of text characters to be replaced with the wildcard is determined based on a ratio of a number of text characters of the wildcard with respect to a number of text characters of the keyword, or based on the number of text characters of the wildcard.

16. The computer-implemented method for performing the document search as claimed in claim 9, wherein the computing the likelihood based on both the forward likelihood and the reverse likelihood computes an average value of the forward likelihood and the reverse likelihood, as an effective likelihood of the hit character string.

* * * * *